United States Patent
Kadota

(10) Patent No.: US 12,353,778 B2
(45) Date of Patent: Jul. 8, 2025

(54) COMMUNICATION APPARATUS, METHOD OF CONTROLLING COMMUNICATION APPARATUS, AND INFORMATION PROCESSING SYSTEM

(71) Applicant: CANON KABUSHIKI KAISHA, Tokyo (JP)

(72) Inventor: Eiji Kadota, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 15 days.

(21) Appl. No.: 18/402,866

(22) Filed: Jan. 3, 2024

(65) Prior Publication Data
US 2024/0241681 A1 Jul. 18, 2024

(30) Foreign Application Priority Data
Jan. 18, 2023 (JP) .................................. 2023-005781

(51) Int. Cl.
*H04N 1/04* (2006.01)
*G06F 3/12* (2006.01)

(52) U.S. Cl.
CPC .......... *G06F 3/1273* (2013.01); *G06F 3/1203* (2013.01); *G06F 3/1288* (2013.01)

(58) Field of Classification Search
None
See application file for complete search history.

(56) References Cited

U.S. PATENT DOCUMENTS

2024/0241681 A1* 7/2024 Kadota ................. G06F 3/1273

FOREIGN PATENT DOCUMENTS

JP          2012-027514 A       2/2012

* cited by examiner

*Primary Examiner* — Cheukfan Lee
(74) *Attorney, Agent, or Firm* — VENABLE LLP

(57) ABSTRACT

A communication apparatus capable of switching to a particular user interface configuration among a plurality of user interface configurations, displaying the particular user interface configuration, and communicating with an information processing apparatus. The communication unit includes a first sending unit that sends user interface configuration information indicating a user interface configuration in use to the information processing apparatus, a reception unit that receives user information associated with the user interface configuration information in the information processing apparatus from the information processing apparatus, and a second sending unit that sends a log of a performed operation while the user interface configuration in use is displayed, the log being sent in association with the user information received by the reception unit.

10 Claims, 13 Drawing Sheets

| RECORD NUMBER | JOB NAME | JOB START TIME | JOB END TIME | JOB STATUS | USER INFORMATION |
|---|---|---|---|---|---|
| 001 | test1 | JAN 1ST, 2022 19:00 | JAN 1ST, 2022 19:05 | FINISHED | TARO YAMADA |
| 002 | test2 | JAN 1ST, 2022 19:10 | JAN 1ST, 2022 19:15 | FINISHED | HANAKO YAMADA |
| 003 | test3 | FEB 1ST, 2022 10:00 | FEB 1ST, 2022 10:10 | ERROR | TARO YAMADA |

FIG.7

COMMUNICATION APPARATUS, METHOD OF CONTROLLING COMMUNICATION APPARATUS, AND INFORMATION PROCESSING SYSTEM

BACKGROUND OF THE INVENTION

Field of the Invention

The present disclosure relates to a communication apparatus, a method of controlling a communication apparatus, and an information processing system.

Description of the Related Art

There is a log information management system in which, in a case where an image processing apparatus or the like executes a job, the image processing apparatus or the like sends log information of the job (information on the amount of printing, print information, etc.) to a management server, and the management server uses the log information to calculate the amount of printing and the amount of money to be charged. To manage each individual user's amount of printing and amount of money charged in such a log information management system, the log information of each job usually includes a user name or user identification information involved in the execution of the job. Japanese Patent Laid-Open No. 2012-027514 proposes a method in which a user name included in log information of a print job is replaced with related information, and this log information is sent to a server.

While log information of each job includes user information involved in the execution of the job in order to manage each individual user's amount of printing and amount of money charged, there are printers without a function to input user information.

SUMMARY OF THE INVENTION

A communication apparatus according to the present disclosure is a communication apparatus capable of switching to a particular user interface configuration among a plurality of user interface configurations, displaying the particular user interface configuration, and communicating with an information processing apparatus, the communication apparatus including: a first sending unit configured to send user interface configuration information indicating a user interface configuration in use to the information processing apparatus; a reception unit configured to receive user information associated with the user interface configuration information in the information processing apparatus from the information processing apparatus; and a second sending unit configured to send a log of a performed operation while the user interface configuration in use is displayed, the log being sent in association with the user information received by the reception unit.

Further features of the present invention will become apparent from the following description of exemplary embodiments with reference to the attached drawings.

BRIEF DESCRIPTION OF THE DRAWINGS

FIG. 7 is a diagram illustrating an example of the log information of the job;

DESCRIPTION OF THE EMBODIMENTS

Figure 1:
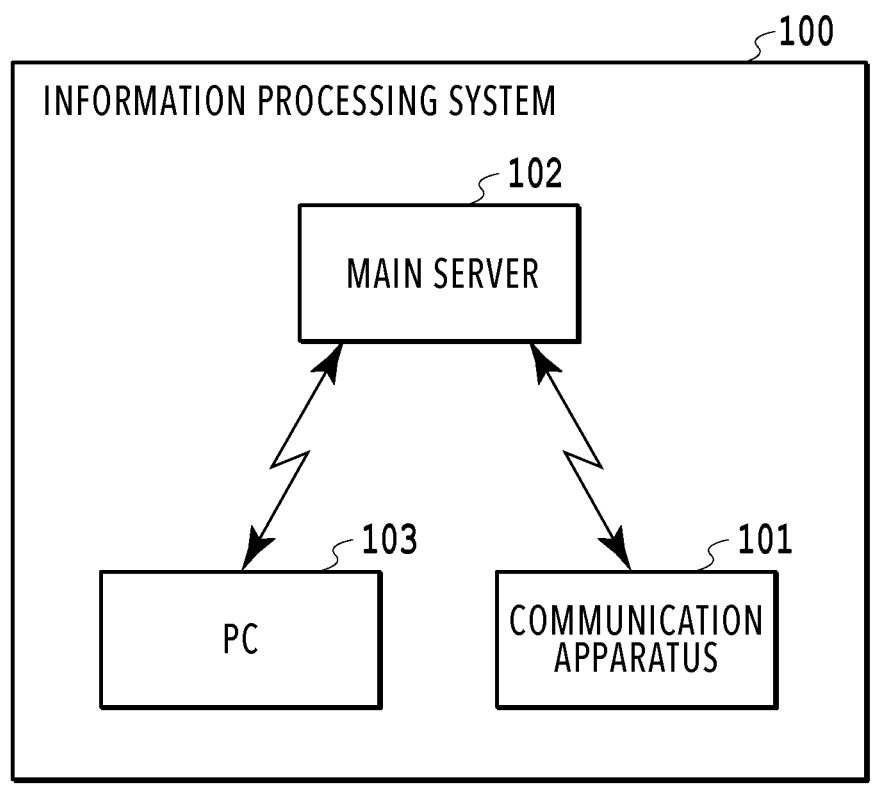
FIG. 1 is a schematic diagram illustrating a system configuration of an information processing system.

Hereinafter, with reference to the attached drawings, the present invention is explained in detail in accordance with preferred embodiments. Configurations shown in the following embodiments are merely exemplary and the present invention is not limited to the configurations shown schematically. In addition, the same components are denoted by the same reference numerals. Further, each process (step) in the flowcharts and the sequence charts is denoted by a reference numeral starting with S.

First Embodiment

A communication apparatus included in an information processing system according to a first embodiment will be described. In the present embodiment, a printer is exemplarily presented as the communication apparatus, but the communication apparatus is not limited to this printer. The present disclosure is applicable to various apparatuses capable of communicating with an information processing apparatus such as a server. For example, in the case of printers, the present disclosure is applicable to inkjet printers, full-color laser beam printers, monochrome printers, and the like. The present disclosure is also applicable to multifunction peripherals (MFPs) having multiple functions such as a copying function, a facsimile function, and a printing function.

FIG. 1 is a schematic diagram illustrating a system configuration of an information processing system 100 according to the present embodiment. A communication apparatus 101 is capable of connecting to a main server 102, which is one form of information processing apparatus, through a network. A personal computer (PC) 103, which is one form of information processing apparatus, is also capable of connecting to the main server 102 through a network. In the present embodiment, an apparatus capable of communicating with the main server 102, such as a smartphone, can be employed as the PC 103.

Figure 2:
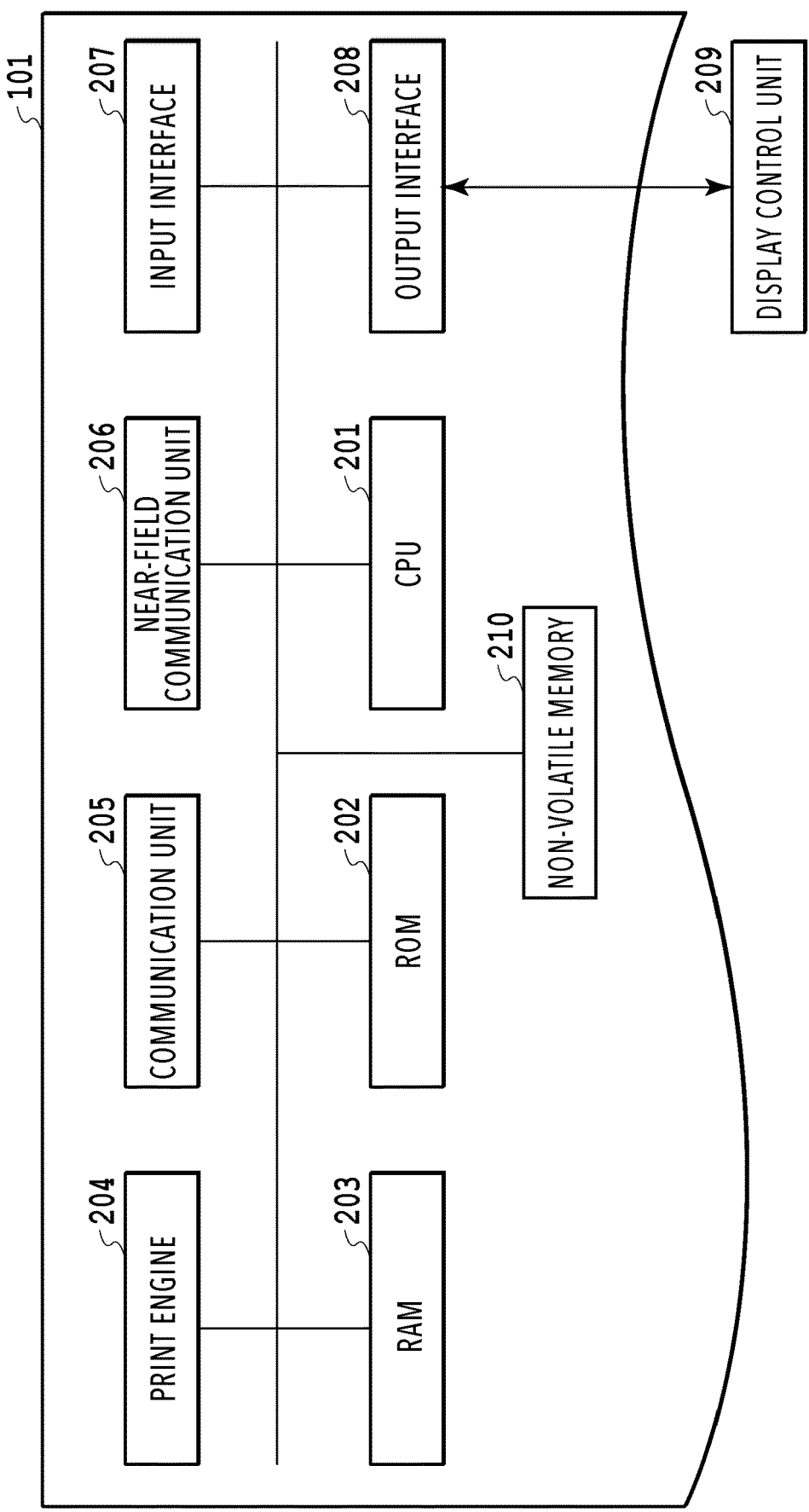
FIG. 2 is a block diagram illustrating a hardware configuration of a communication apparatus.

FIG. 2 is a diagram illustrating a hardware configuration of the communication apparatus 101. The communication apparatus 101 includes a central processing unit (CPU) 201, a read only memory (ROM) 202, a random access memory (RAM) 203, a print engine 204, a communication unit 205, a near-field communication unit 206, an input interface 207, an output interface 208, a display control unit 209, and a non-volatile memory 210. The communication apparatus 101 is assumed to be a printer apparatus such as an MFP, but the communication apparatus 101 is not limited to an MFP.

The CPU 201 is a system control unit and comprehensively controls the communication apparatus 101. The ROM 202 stores pieces of fixed data such as control programs to be executed by the CPU 201, data tables, and an OS program. In the present embodiment, each control program stored in the ROM 202 performs software execution control such as scheduling, task switching, and interrupt handling under the control of a built-in OS stored in the ROM 202. Also, a memory area to store data that needs to be retained even without power supply, such as management data of the communication apparatus 101, is provided in the ROM 202. The RAM 203 includes a dynamic random access memory (DRAM) or the like that requires a backup power supply. The data in the RAM 203 are retained with a power supply for data backup not illustrated. Thus, the RAM 203 is capable of storing important data, such as program control variables, without letting the data discard. The RAM 203 is also used as a main memory and a work area for the CPU 201 and functions as a reception buffer to temporarily save received print information. Moreover, the RAM 203 saves various information.

The print engine 204 forms an image on a print medium, such as paper, by using a printing material, such as an ink, based on information saved in the RAM 203 and a received print job, and outputs the print result. The amount of data to be sent as the print job in this process is large, and high-speed communication is required. Thus, the print job is received via the communication unit 205, which is capable of performing communication at a higher speed than the near-field communication unit 206.

The communication unit 205 has an access point inside the communication apparatus 101 for the communication apparatus 101 to connect to an external apparatus. Examples of the communication method include Wireless Fidelity (Wi-Fi) (registered trademark), Bluetooth (registered trademark), and the like. The communication unit 205 may include hardware that functions as an access point, or operate as an access point by means of software that causes the communication unit 205 to function as an access point.

The near-field communication unit 206 communicates with the CPU 201 through a bus interface, such as an inter-integrated circuit (I2C). The input interface 207 is an interface that receives data inputs and operation instructions from the user and includes a physical keyboard and buttons, a touch panel, or the like. The output interface 208 is an interface that performs control for display of data on the display control unit 209 and notification of the status of the communication apparatus 101. The input interface 207 and the output interface 208 may be the same component. A configuration in which the same component receives operations from the user and outputs screens may be employed.

The display control unit 209 includes light emitting diodes (LEDs), a liquid crystal display (LCD), or the like, and displays data and notifies the status of the communication apparatus 101. The display control unit 209 may be equipped with a software keyboard including keys such as number input keys, mode setting keys, an enter key, a cancel key, and a power key. The communication apparatus 101 receives inputs from the user through the display control unit 209.

The non-volatile memory 210 includes a device such as an electrically erasable programmable read only memory (EEPROM) or a flash memory. The non-volatile memory 210 is mainly used to save data that needs to be retained even while power is not supplied to the communication apparatus 101, such as setting values of the communication apparatus 101. A storage device such as a hard disk drive (HDD), a solid state drive (SSD), a universal serial bus (USB) memory, or a Secure Digital (SD) card, may be mounted in the communication apparatus 101 as an optional device. Information to be saved in the communication apparatus 101 may be saved in this storage device.

Processing according to the present embodiment will be described using FIGS. 3 to 7. This processing is implemented by a CPU in each apparatus reading and executing programs stored in a storage region in an ROM, a RAM, or the like.

Figure 3:
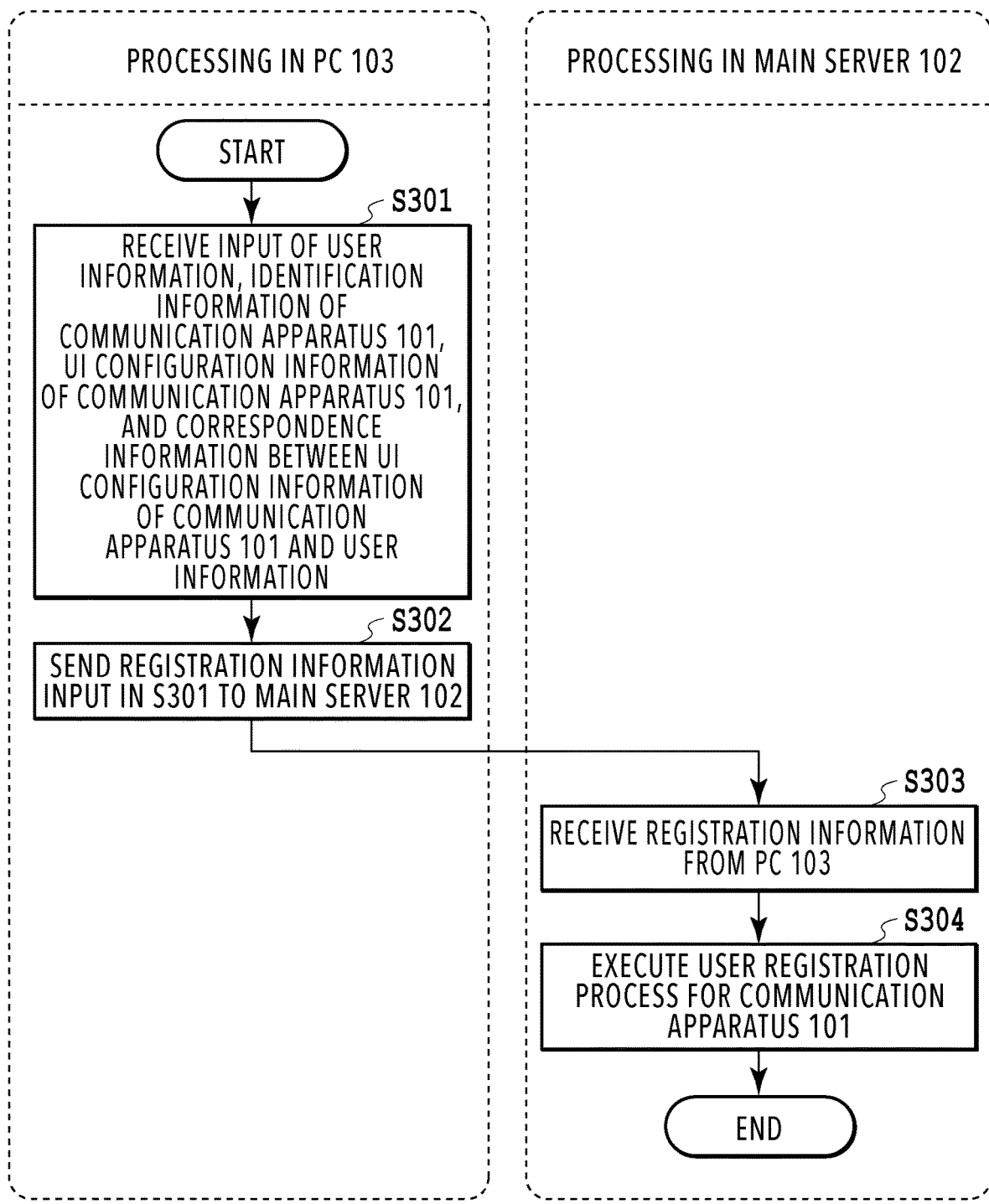
FIG. 3 is a flowchart illustrating a process of registering information on the communication apparatus and user information.

A process of registering identification information of the communication apparatus 101 and user information of a user using the communication apparatus 101 in the main server 102 by using the PC 103 will be described using the flowchart of FIG. 3. The processing in the flowchart of FIG. 3 is initiated in response to a user executing a predetermined process indicating initiation of the process of registering the identification information of the communication apparatus 101 and the user information of the user using the communication apparatus 101 in the main server 102 by using the PC 103. This predetermined process is, for example, pressing of a register button of a tool that registers the identification information of the communication apparatus 101 and the user information of the user using the communication apparatus 101 in the main server 102.

In S301, the PC 103 receives input of predetermined information through a user interface (UI) on the PC 103. The predetermined information includes the user information of the user using the communication apparatus 101, the identification information of the communication apparatus 101, UI configuration information of the communication apparatus 101, and correspondence information indicating the correspondence between the UI configuration information of the communication apparatus 101 and the user information. The PC 103 receives input of the above predetermined information, and the processing proceeds to S302.

In the present embodiment, the user information is assumed to be, but not limited to, information identifying the user, such as a user name. In the present embodiment, the identification information of the communication apparatus 101 is assumed to the serial number of the communication apparatus 101, but is not limited to this information. Any of various types of information can be employed as the identification information of the communication apparatus 101 as long as the information can identify the communication apparatus 101. For example, a media access control (MAC) address, an original name set by the user, or the like can be employed. The UI configuration information used by the communication apparatus 101 is information identifying a menu configuration and menu layout for each of users who use the communication apparatus 101 as illustrated in FIGS. 4A to 4C.

The contents in FIGS. 4A to 4C will be described in detail below. FIGS. 4A to 4C are diagrams illustrating custom home screens corresponding to tabs "1", "2", and "3" to be displayed on a control panel. The tab color of each one of tabs 402, 403, and 404 can be changed from the rest of the tabs to indicate that the custom home screen for the corresponding tab "1", "2", or "3" is being displayed. Custom menus 412, 413, 414, 416, 417, 418, 420, 421, and 422 are menus which the users can customize, and the users can designate the functions to be displayed at the menu positions. The name "WORK" of a custom screen 411 under the tab "1", the name "001" of a custom screen 415 under the tab "2", the name "002" of a custom screen 419 under the tab "3" each represents a user's UI configuration information. Also, the UI configuration information may be a character string automatically assigned by the communication apparatus 101. The user may select a character string held in the communication apparatus 101. The user may input a character string including a numeric value by using number input keys.

Figure 4A:
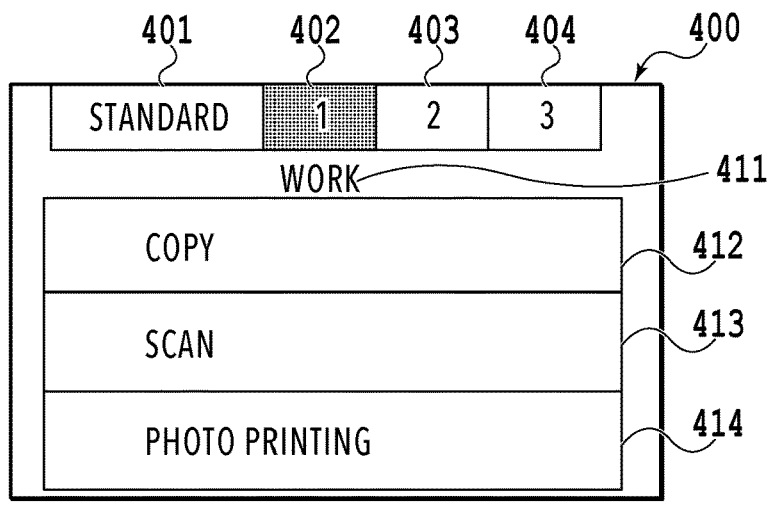
FIG. 4A is a conceptual diagram illustrating a menu configuration for a user of the communication apparatus.
Figure 4B:
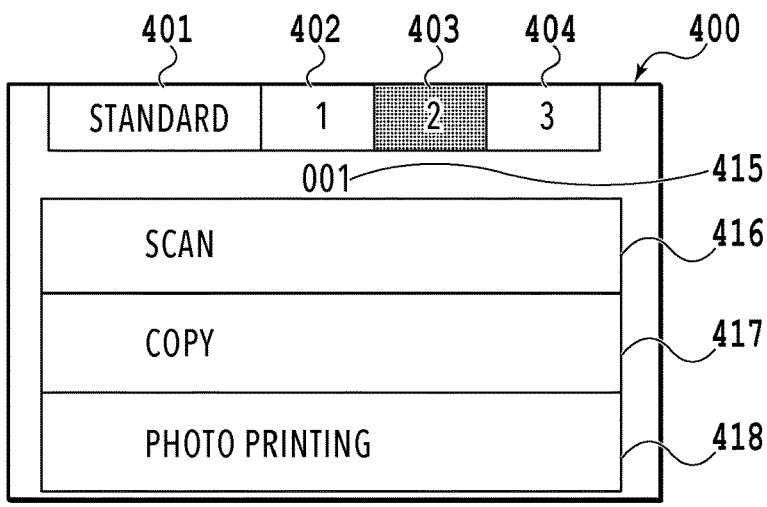
FIG. 4B is a conceptual diagram illustrating a menu configuration for a user of the communication apparatus.
Figure 4C:
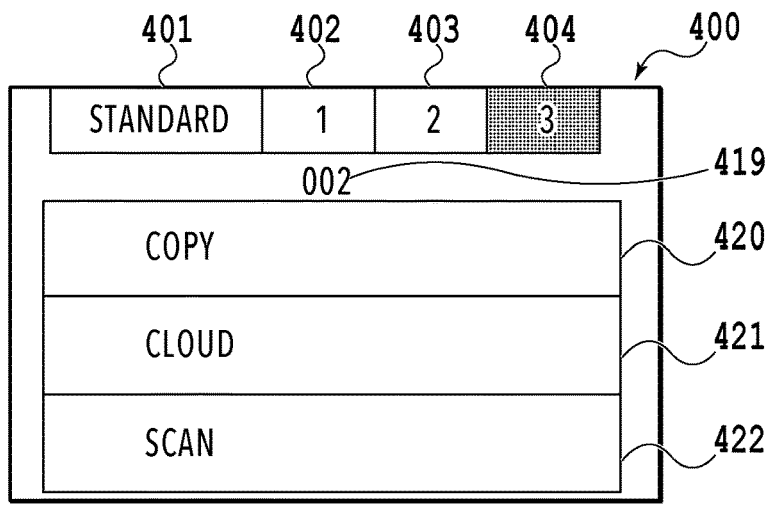
FIG. 4C is a conceptual diagram illustrating a menu configuration for a user of the communication apparatus.

The UI configuration illustrated in FIG. 4A includes "COPY", "SCAN", and "PHOTO PRINTING", and its UI configuration information is "WORK." In a case where the user information using this UI configuration information is "AAA," then, information in which the UI configuration information "WORK" and the user information "AAA" are associated with each other is the correspondence information between the UI configuration information and the user information. The UI configuration illustrated in FIG. 4B includes "SCAN", "COPY", and PHOTO PRINTING", and its UI configuration information is "001." In a case where the user information using this UI configuration information is "BBB," then, information in which the UI configuration information "001" and the user information "BBB" are associated with each other is the correspondence information between the UI configuration information and the user information. The UI configuration illustrated in FIG. 4C includes "COPY", "CLOUD", and "SCAN," and its UI configuration information is "002." In a case where the user information using this UI configuration information is "CCC," then, information in which the UI configuration information "002" and the user information "CCC" are associated with each other is the correspondence information between the UI configuration information and the user information.

In S302, the PC 103 sends the predetermined information input in S301, or registration information, to the main server 102. The processing then proceeds to S303. In S303, the main server 102 receives the registration information sent from the PC 103 in S302. The processing then proceeds to S304. In S304, the main server 102 executes a user registration process for the communication apparatus 101 by using the registration information received in S303. After the main server 102 completes the user registration process for the communication apparatus 101, the processing in the flowchart illustrated in FIG. 3 is finished.

Figure 5:
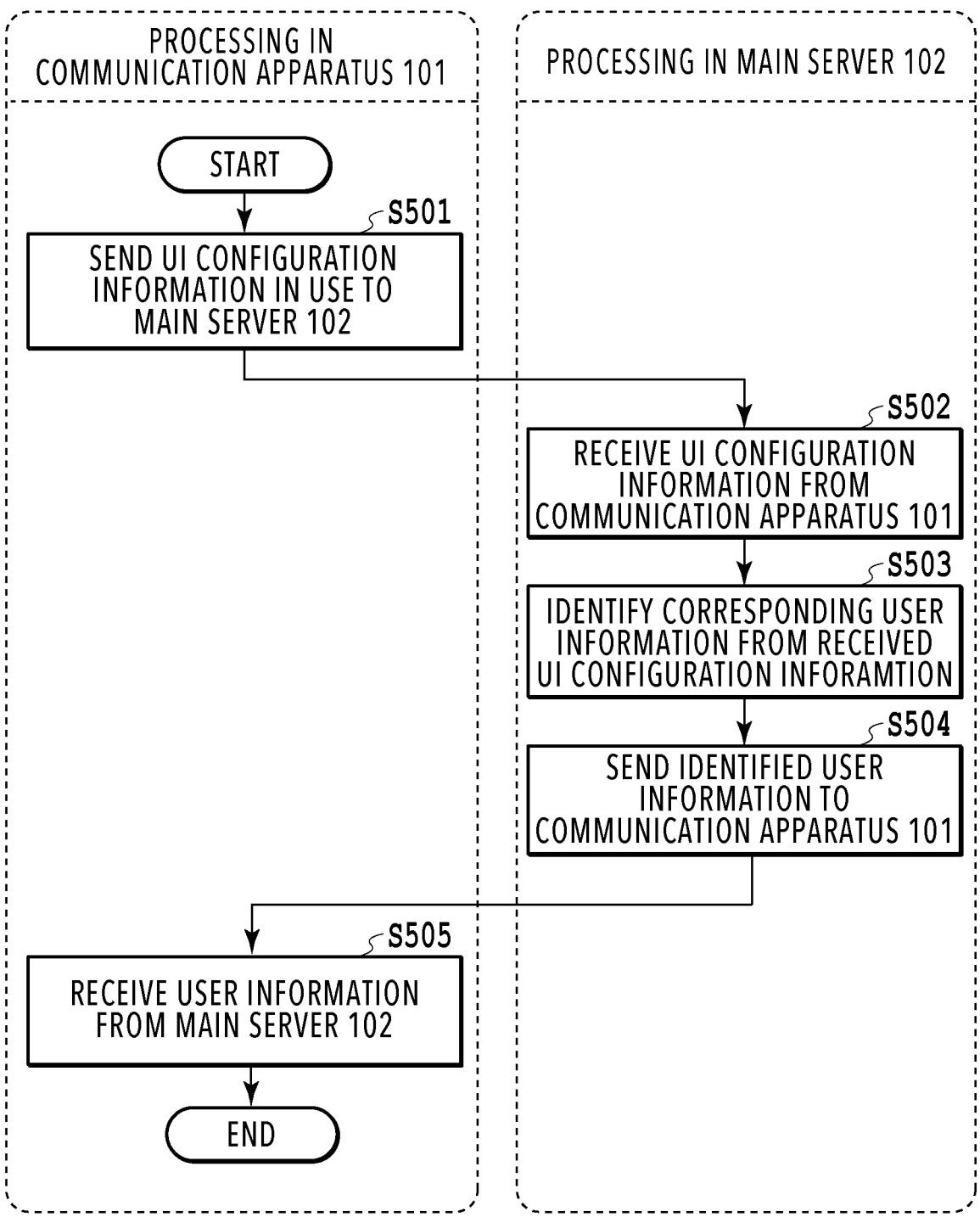
FIG. 5 is a flowchart illustrating a process of receiving user information at the communication apparatus.

Processing from a point where the communication apparatus 101 sends UI configuration information to the main server 102 to a point where the communication apparatus 101 receives user information from the main server 102 will be described using the flowchart illustrated in FIG. 5. The processing in the flowchart illustrated in FIG. 5 is executed before the communication apparatus 101 saves log information of a job, such as a print process, or sends the log information of the job to the main server 102 after the processing in the flowchart illustrated in FIG. 3 is completed and the communication apparatus 101 executes the job. The processing illustrated in FIG. 5 is processing for transferring user information to the communication apparatus 101. In the case of saving the log information, this user information can be used in the communication apparatus 101 to display the log information on the display control unit 209 or to print the log information.

In S501, the communication apparatus 101 sends UI configuration information set in the communication apparatus 101 that is in use (displayed) to the main server 102. The processing then proceeds to S502. In S501, the communication apparatus 101 sends the UI configuration information in use to the main server 102 even without receiving an explicit request to send the UI configuration information in use from the main server 102. In S502, the main server 102 receives the UI configuration information sent from the communication apparatus 101 in S501. The processing then proceeds to S503. In S503, based on the registration information registered in S304, the main server 102 identifies the user information corresponding to the UI configuration information received in S502. The processing then proceeds to S504. In S504, the main server 102 sends the user information identified in S503 to the communication apparatus 101. The processing then proceeds to S505.

In S505, the communication apparatus 101 receives the user information sent from the main server 102 in S504, which corresponds to the UI configuration information sent in S501. After the communication apparatus 101 receives the user information, which corresponds to the UI configuration information sent in S501, the processing in the flowchart illustrated in FIG. 5 is finished.

The communication apparatus 101 may issue a request to collectively obtain the pieces of user information corresponding to all pieces of UI configuration information set in the communication apparatus 101 to the main server 102. In a case where the main server 102 receives the request to collectively obtain the pieces of user information corresponding to all pieces of UI configuration information set in the communication apparatus 101 from the communication apparatus 101, the main server 102 sends the pieces of user information corresponding to all pieces of UI configuration information to the communication apparatus 101.

Figure 6:
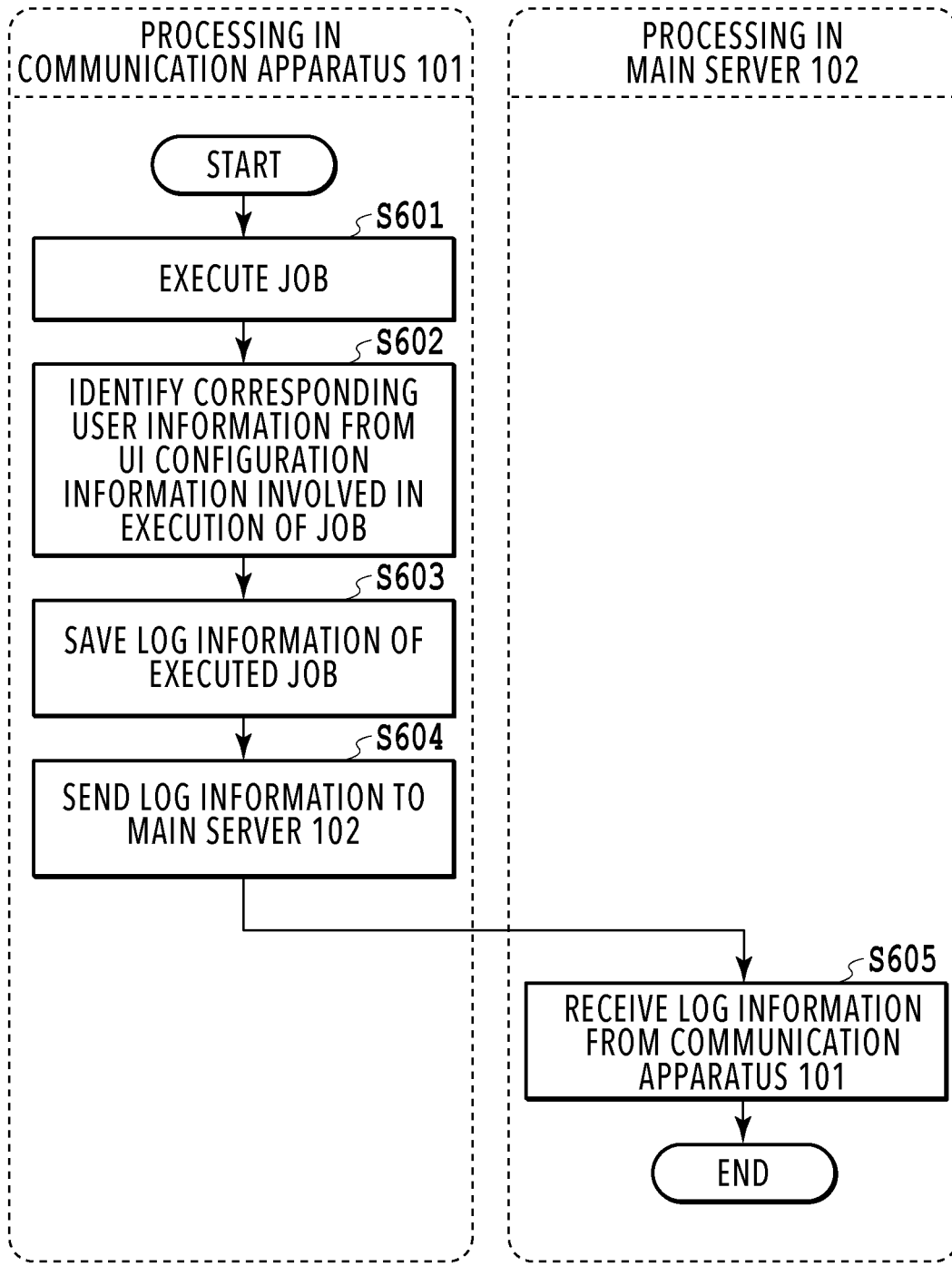
FIG. 6 is a flowchart illustrating a process of receiving log information of a job at an information processing apparatus.

Processing in which the communication apparatus 101 executes a job and the main server 102 receives the log information of the job executed by the communication apparatus 101 will be described using the flowchart of FIG. 6. The processing in the flowchart illustrated in FIG. 6 is executed in a case where the communication apparatus 101 executes a job (saves job information) after the processing in the flowchart illustrated in FIG. 5 is completed.

In S601, the communication apparatus 101 executes a job. In the present embodiment, the job is assumed to be a print process but is not limited to this process. The communication apparatus 101 may execute another job. After the communication apparatus 101 executes the job, the processing proceeds to S602.

In S602, based on the information received in S505, the communication apparatus 101 identifies the user information corresponding to the UI configuration information involved in the execution of the job in S601. The processing then proceeds to S603. In S603, the communication apparatus 101 saves the log information of the job executed in S601. The processing then proceeds to S604. This log information also includes the user information identified in S602. In the present embodiment, the log information of the job saved in S603 is assumed to be, but not limited to, the format illustrated in FIG. 7. The communication apparatus 101 may be configured to select whether to use the user information identified in S602 or the character string representing the UI configuration information used to identify the user information in S602 as an item to be saved as the log information of the job in S603.

In S604, the communication apparatus 101 sends the log information of the job saved in S603 to the main server 102 on a regular basis or on a non-regular basis. The processing then proceeds to S605. Sending the log information to the main server 102 on a non-regular basis refers to the following case. Specifically, in a case where a predetermined amount of log information is accumulated in the communication apparatus 101, the communication apparatus 101 sends the log information to the main server 102. The communication apparatus 101 may save the character string representing the UI configuration information in the log information of the job instead of the user information and, in a case where the user information has been obtained, replace the character string representing the UI configuration information with the user information when sending the log information to the main server 102.

The log information of the job saved in S603 may be printed with the communication apparatus 101 or displayed on the display control unit 209 of the communication apparatus 101 displaying a UI screen. The printed log information and the log information displayed on the UI screen include the user information. In S605, the main server 102 receives the log information of the job sent from the communication apparatus 101. After the main server 102 receives the log information of the job, the processing in the flowchart illustrated in FIG. 6 is finished.

In S602, the communication apparatus 101 may fail to identify the user information corresponding to the UI configuration information involved in the execution of the job in S601. Then, the communication apparatus 101 sends log information including the character string representing the UI configuration information to the main server 102. In this case, the main server 102 replaces the character string representing the UI configuration information that is included in the log information with the user information, and saves the log information after this replacement.

Incidentally, the present disclosure can be implemented by the following method. In this method, log information in the main server 102 includes user information but the log information in the communication apparatus 101 includes no user information. In a case where the processing in FIG. 5 and the processing in FIG. 6 described above are performed, the log information to be printed by the communication apparatus 101 and the log information to be displayed on the UI screen include the user information. However, in the case of performing processing by this method, the log information to be printed by the communication apparatus 101 and the log information to be displayed on the UI screen cannot include the user information. The above method may be used as exceptional processing in a case where the processing illustrated in FIG. 5 is not completed.

Figure 8:
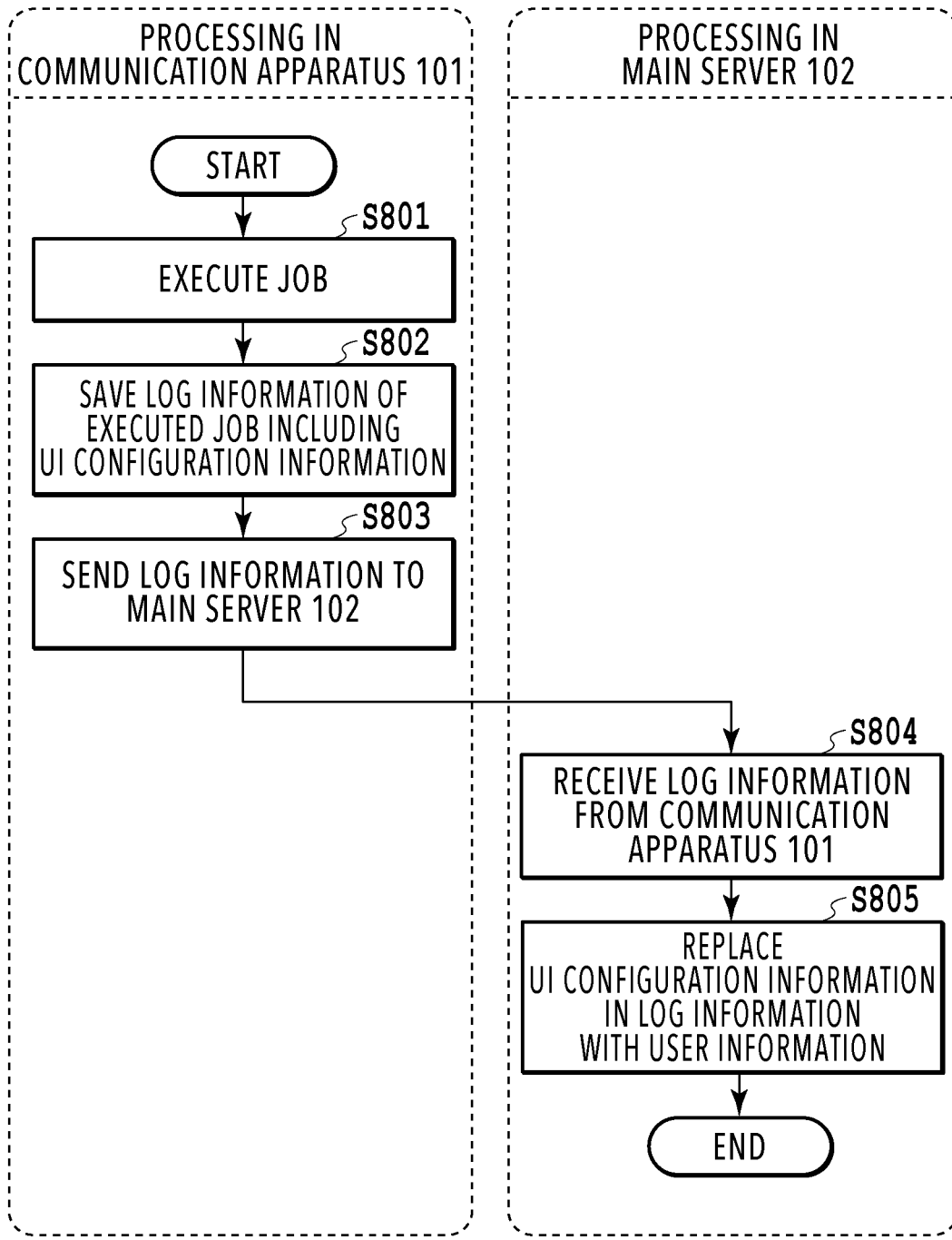
FIG. 8 is a flowchart illustrating a process of receiving the log information of the job at the information processing apparatus.

In the above method, the processing illustrated in FIG. 3 is executed, so that the UI configuration information and the user information are associated with each other in the main server 102. Thereafter, in a case of failing to successfully performing the communication processing in the flowchart of FIG. 5 or another similar case, the communication apparatus 101 and the main server 102 perform the processing illustrated in the flowchart of FIG. 8. The processing in the flowchart illustrated in FIG. 8 is executed in a case where the communication apparatus 101 executes a job (saves job information).

In S801, the communication apparatus 101 executes a job. The processing then proceeds to S802. In S802, the communication apparatus 101 saves the log information of the job including the UI configuration information. The processing then proceeds to S803. In S803, the communication apparatus 101 sends the log information of the job saved in S802 to the main server 102. The processing then proceeds to S804. In S804, the main server 102 receives the log information of the job sent from the communication apparatus 101. The processing then proceeds to S805. In S805, the main server 102 replaces the UI configuration information in the received log information with the user information corresponding to the UI configuration information. After the main server 102 completes this replacement process, the processing in the flowchart illustrated in FIG. 8 is finished.

As described above, by executing the processing in FIGS. 3, 5, and 6, the communication apparatus 101 cooperates with the main server 102 such that the log information of a job executed by the communication apparatus 101 can be sent to the main server 102 with the user name included in the log information. Moreover, the user information can also be included in the log information to be printed by the communication apparatus 101 and the log information to be displayed on the UI screen. Thus, according to the present disclosure, it is possible to improve usability related to functions that use the user information.

Second Embodiment

Figure 9:
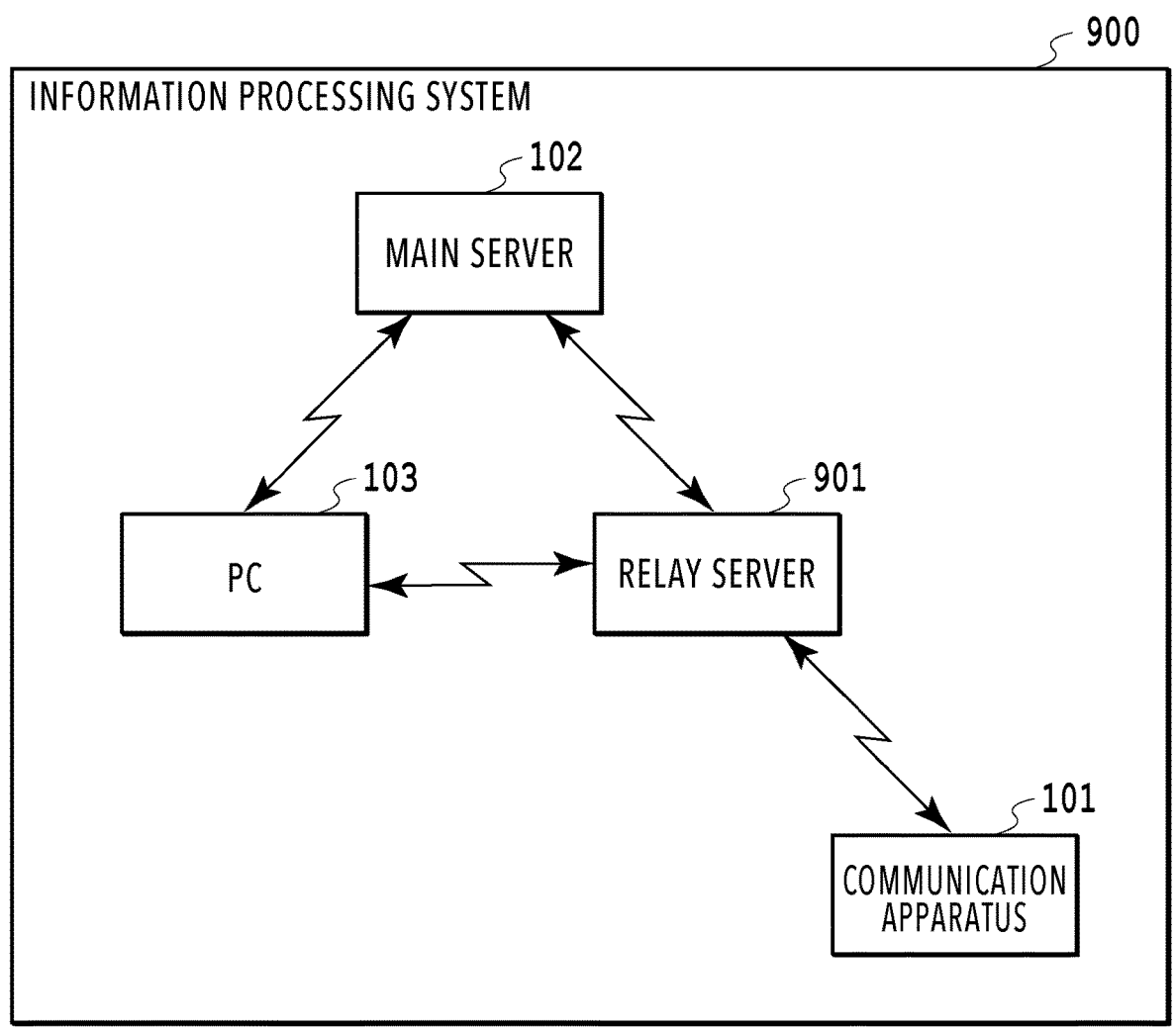
FIG. 9 is a schematic diagram illustrating a system configuration of the information processing system.

FIG. 9 is a diagram illustrating a configuration of an information processing system 900 representing an example of a second embodiment. A PC 103 is capable of connecting to a main server 102 and a relay server 901, which is one form of information processing apparatus, through networks. A communication apparatus 101 is capable of connecting to the relay server 901 through a network. The relay server 901 is capable of connecting to the main server 102 through a network.

Figure 10:
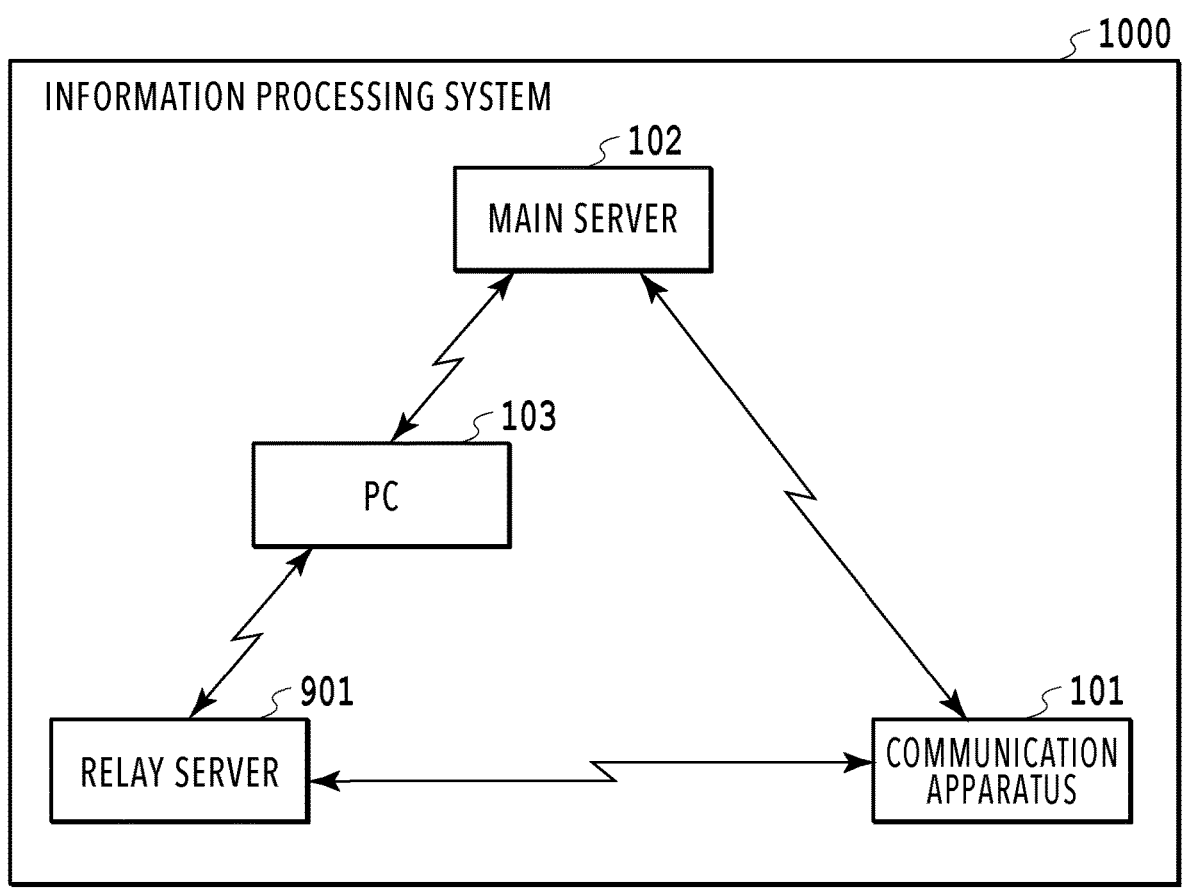
FIG. 10 is a schematic diagram illustrating the system configuration of the information processing system.

FIG. 10 is a diagram illustrating a configuration of an information processing system 1000 representing another example of the present embodiment. The PC 103 is capable of connecting to the main server 102 and the relay server 901 through networks. The communication apparatus 101 is capable of connecting to the main server 102 and the relay server 901 through networks. In the present embodiment, the communication apparatus 101 may communicate with the main server 102 through the relay server 901, as in the system configuration in FIG. 9. The communication apparatus 101 may communicate with the main server 102 and the relay server 901, as in the system configuration in FIG. 10. In the first embodiment, the main server 102 performs all processes for the management of the UI configuration information and log information in the communication apparatus 101, etc. In the second embodiment, plural servers are prepared to divide roles. Specifically, the UI configuration information in the communication apparatus 101 is stored in the relay server 901 while the log information in the communication apparatus 101 is stored in the main server 102.

In the first embodiment, a process of sending the log information of a job to the main server 102 with user information included in the log information by using the information processing system illustrated in FIG. 1 has been mainly described. In the second embodiment, a process of sending the log information of a job to the main server 102 with a user name included in the log information by using the information processing system illustrated in FIG. 9 or 10 will be described.

Figure 11:
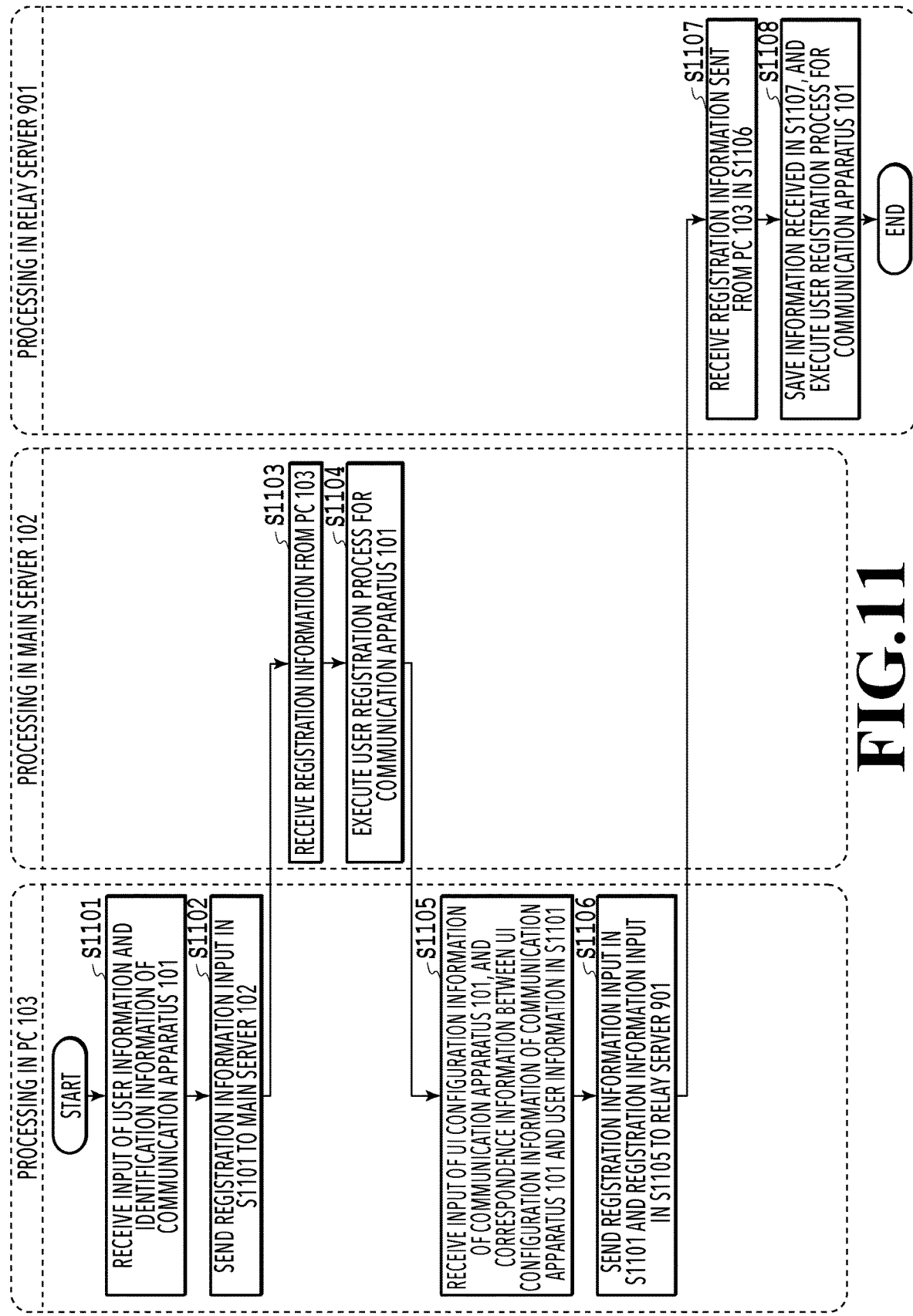
FIG. 11 is a flowchart illustrating a process of registering information on the communication apparatus and user information.
Figure 12:
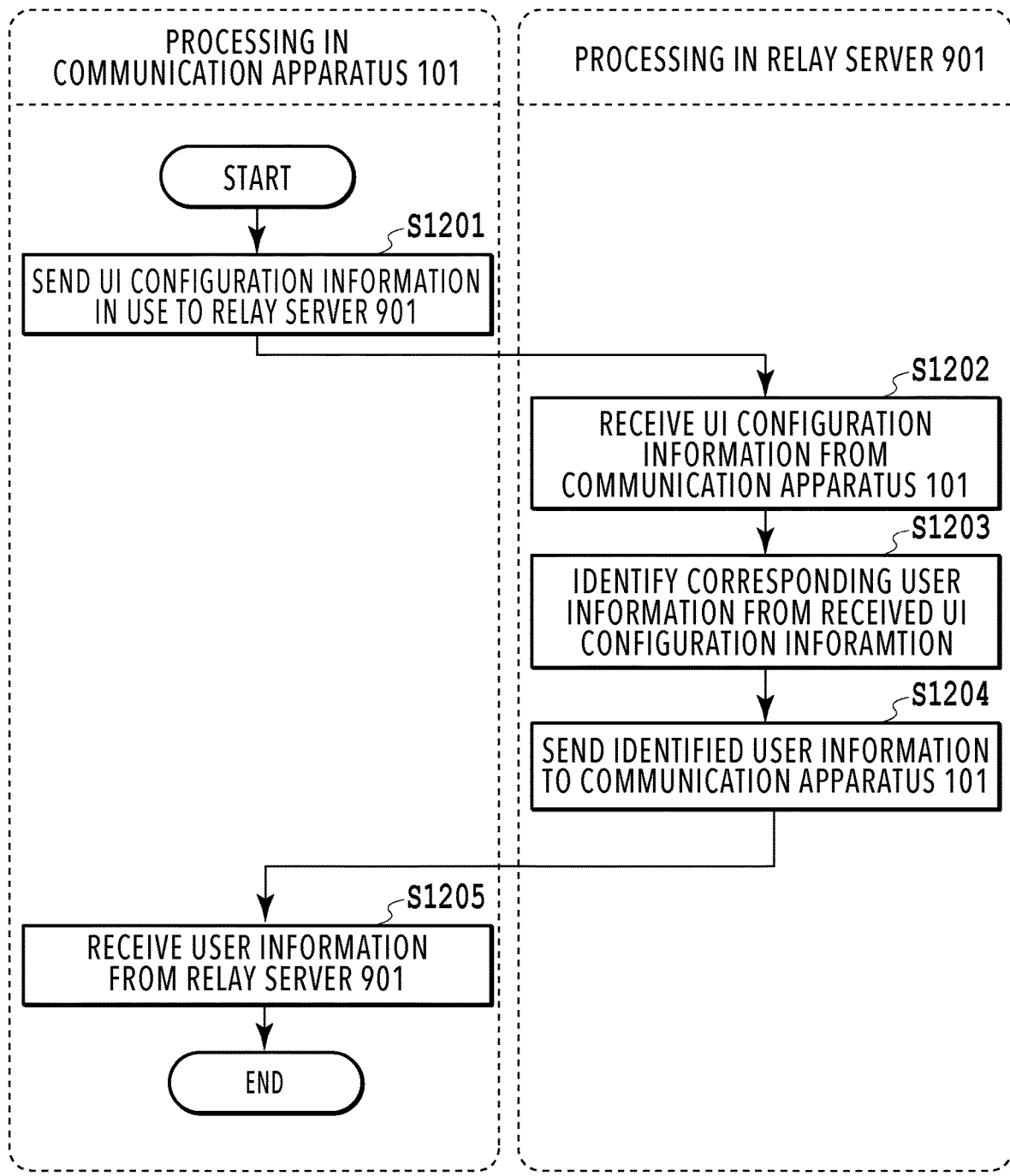
FIG. 12 is a flowchart illustrating a process of receiving user information at the communication apparatus.

Processing according to the present embodiment will be described with reference to FIGS. 11 to 13. This processing is implemented by the CPU in each apparatus reading and executing programs stored in a storage region in the ROM, the RAM, or the like. Note that the configuration of each apparatus in the present embodiment is assumed to be similar to that in the first embodiment unless otherwise noted, and description thereof is omitted.

In the present embodiment, the following description will be given on the assumption that the main server 102 and the relay server 901 each need to perform user registration. A process of registering the identification information of the communication apparatus 101 and user information of a user using the communication apparatus 101 in the main server 102 and the relay server 901 by using the PC 103 will be described using the flowchart of FIG. 11. The processing in FIG. 11 is executed in a case where a user registers the identification information of the communication apparatus 101 and the user information of the user using the communication apparatus 101 in the main server 102 and the relay server 901 by using the PC 103.

In S1101, the PC 103 receives input of the user information of the user using the communication apparatus 101 and the identification information of the communication apparatus 101 through a UI on the PC 103. Unlike the first embodiment, the identification information of the communication apparatus 101 includes neither the UI configuration information to be used in the communication apparatus 101 nor the correspondence information between the user information of the user using the communication apparatus 101 and the UI configuration information to be used in the communication apparatus 101. The PC 103 receives input of the user information of the user using the communication apparatus 101 and the identification information of the communication apparatus 101, and then the processing proceeds to S1102.

In S1102, the PC 103 sends the user information of the user using the communication apparatus 101 and the identification information of the communication apparatus 101 input in S1101 to the main server 102. The processing then proceeds to S1103. In S1103, the main server 102 receives the user information of the user using the communication apparatus 101 and the identification information of the communication apparatus 101 sent from the PC 103 in S1102. The processing then proceeds to S1104. In S1104, the main server 102 executes a user registration process for the communication apparatus 101 by using the user information of the user using the communication apparatus 101 and the identification information of the communication apparatus 101 received in S1103. After the main server 102 completes the registration process for the communication apparatus 101, the processing proceeds to S1105 in response to the PC 103 receiving a notification indicating the completion of the registration from the main server 102. Note that the process of registering the user information and the identification information of the communication apparatus 101 in the main server 102 is an essential process. In a case where the PC 103 does not receive the notification indicating the completion of the registration process, the PC 103 will not cause the relay server 901 to perform a registration process for the communication apparatus 101.

In S1105, the PC 103 receives input of the following information corresponding to the user information input in S1101 through a UI on the PC 103. The information is the UI configuration information of the user who gave the input in S1101, and correspondence information between the UI configuration information and the user information input in S1101. The processing proceeds to S1106 in response to the PC 103 receiving input of the above information.

In S1106, the PC 103 sends the information input in S1101 and the information input in S1105 to the relay server 901. The processing then proceeds to S1107. In S1107, the relay server 901 receives the registration information sent from the PC 103 in S1106. The processing then proceeds to S1108. In S1108, the relay server 901 saves the registration information received in S1107 and executes a user registration process for the communication apparatus 101. After the relay server 901 saves the registration information received in S1107 and completes the user registration process for the communication apparatus 101, the processing in the flowchart illustrated in FIG. 11 is finished. Processing from a point where the communication apparatus 101 sends UI configuration information to the relay server 901 to a point where the communication apparatus 101 receives user information from the relay server 901 will be described using the flowchart of FIG. 12. The processing illustrated in FIG. 12 is executed in a case where the communication apparatus 101 sends UI configuration information to the relay server 901 after the processing illustrated in FIG. 11 is completed.

In S1201, the communication apparatus 101 sends UI configuration information set in the communication apparatus 101 that is in use to the relay server 901. The processing then proceeds to S1202. In S1202, the relay server 901 receives the UI configuration information sent from the communication apparatus 101 in S1201. The processing then proceeds to S1203. In S1203, based on the registration information registered in S1108, the relay server 901 identifies the user information corresponding to the UI configuration information received in S1202. The processing then proceeds to S1204. In S1204, the relay server 901 sends the user information identified in S1203 to the communication apparatus 101. The processing then proceeds to S1205.

In S1205, the communication apparatus 101 receives the user information sent from the relay server 901 in S1204, which corresponds to the UI configuration information sent in S1201. After the communication apparatus 101 receives the user information, which corresponds to the UI configuration information sent in S1201, the processing in the flowchart illustrated in FIG. 12 is finished. The communication apparatus 101 may issue a request to collectively obtain the pieces of user information corresponding to all pieces of UI configuration information set in the communication apparatus 101 to the relay server 901. In a case where the relay server 901 receives the request to collectively obtain the pieces of user information corresponding to all pieces of UI configuration information set in the communication apparatus 101 from the communication apparatus 101, the relay server 901 sends the pieces of user information corresponding to all pieces of UI configuration information to the communication apparatus 101.

Processing in which the communication apparatus 101 executes a job and the main server 102 receives the log information of the job executed by the communication apparatus 101 will be described with reference to the flowchart of FIG. 13. The processing in FIG. 13 is executed in a case where the communication apparatus 101 executes a job after the processing in FIG. 12 is completed.

In S1301, the communication apparatus 101 executes a job. In the present embodiment, the job is assumed to be a print process but is not limited to this process. The communication apparatus 101 may execute another job. After the communication apparatus 101 executes the job, the processing proceeds to S1302.

In S1302, based on the information received in S1205, the communication apparatus 101 identifies the user information corresponding to the UI configuration information involved in the execution of the job in S1301. The processing then proceeds to S1303. In S1303, the communication apparatus 101 saves the log information of the job executed in S1301. The processing then proceeds to S1304. This log information also includes the user information identified in S1302. In the present embodiment, the log information of the job saved in S1303 is assumed to be, but not limited to, the format illustrated in FIG. 7. The communication apparatus 101 may be configured to select whether to use the user information identified in S1302 or the character string representing the UI configuration information used to identify the user information in S1302 as an item to be saved as the log information of the job in S1303. The communication apparatus 101 may also be configured such that, in a case of failing to identify the user information corresponding to the UI configuration information involved in the execution of the job in S1301, the communication apparatus 101 saves the character string representing the UI configuration information instead of the user information in the log information of the job. The case where the communication apparatus 101 fails to identify the user information corresponding to the UI configuration information involved in the execution of the job includes a case where the communication apparatus 101 fails to receive user information from the relay server 901 in S1205.

In S1304, the communication apparatus 101 sends the log information of the job saved in S1303 to the relay server 901. The processing then proceeds to S1305. In S1305, the relay server 901 receives the log information of the job sent from the communication apparatus 101. The processing then proceeds to S1306. In S1306, the relay server 901 sends the log information of the job by the communication apparatus 101 received in S1305 to the main server 102. The processing then proceeds to S1307. In S1307, the main server 102 receives the log information of the job by the communication apparatus 101 sent from the relay server 901 in S1306. After the main server 102 receives the log information of the job by the communication apparatus 101, the processing in the flowchart illustrated in FIG. 13 is finished. In S1302, the communication apparatus 101 may fail to identify the user information corresponding to the UI configuration information involved in the execution of the job in S1301. Then, the communication apparatus 101 sends the log information including the character string representing the UI configuration information to the relay server 901. In this case, the relay server 901 replaces the character string representing the UI configuration information that is included in the log information with the user information, and saves the log information after this replacement. The relay server 901 then sends the log information after the replacement to the main server 102.

Figure 13:
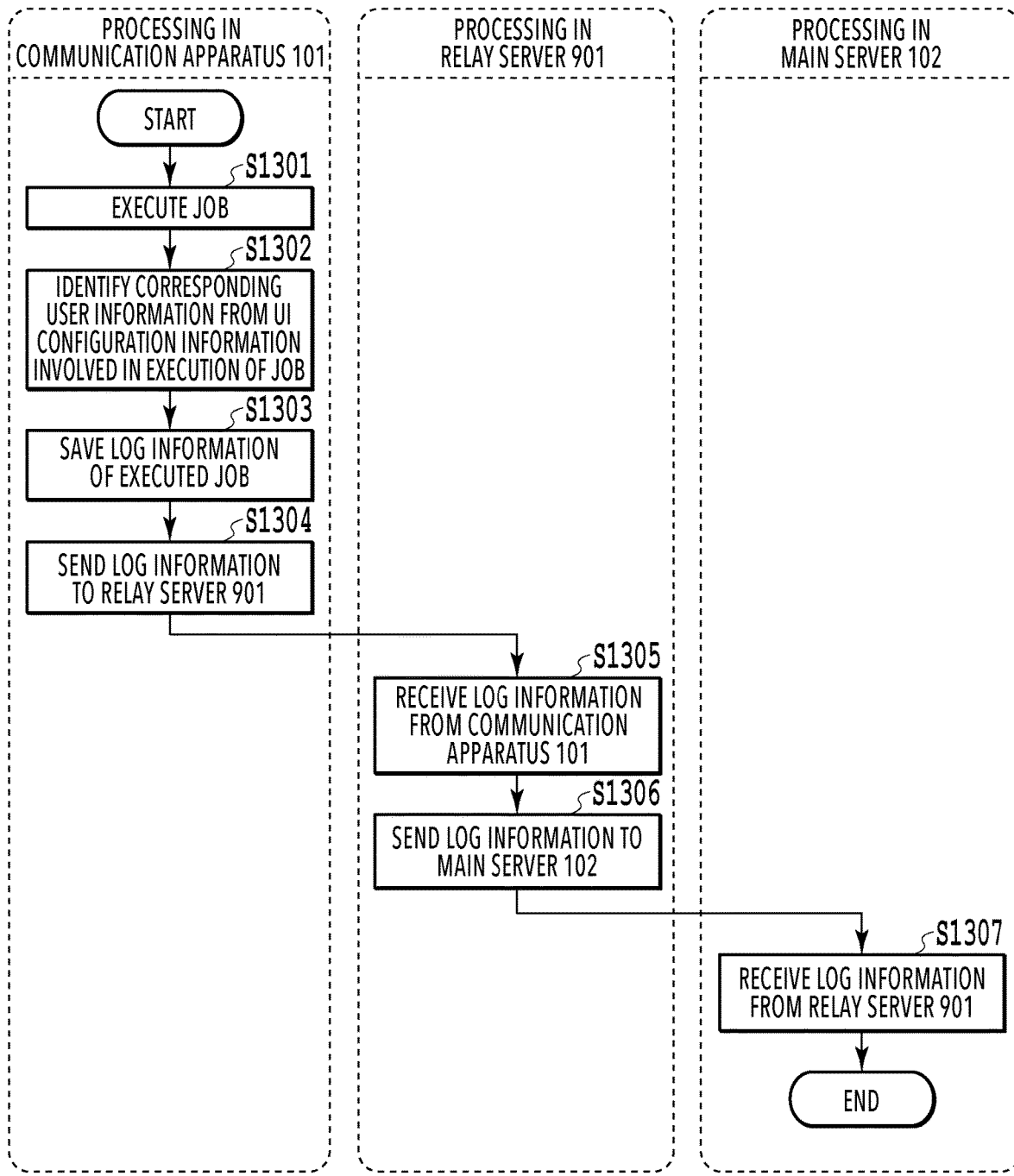
FIG. 13 is a flowchart illustrating a process of receiving log information of a job at the information processing apparatus.

The flowchart of FIG. 13 describes the processing in which the communication apparatus 101 sends the log information of a job to the main server 102 through the relay server 901 as illustrated in FIG. 9. The communication apparatus 101 may send the log information of a job directly to the main server 102 as illustrated in FIG. 10.

As described above, by executing the processing in FIGS. 11 to 13, the communication apparatus 101 cooperates with the main server 102 and the relay server 901 as illustrated in FIG. 9 or 10 such that the log information of a job including user information can be sent to the main server 102.

Other Embodiments

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

Moreover, the aforementioned functions of the embodiment are implemented not only by the computer executing the read program code. Specifically, the present invention includes the case where an OS or the like operating on the computer performs all or part of actual processing based on instructions of the program code and the aforementioned functions of the embodiments are implemented through this processing.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2023-005781, filed Jan. 18, 2023, which is hereby incorporated by reference herein in its entirety.

What is claimed is:

1. A communication apparatus capable of switching to a particular user interface configuration among a plurality of user interface configurations, displaying the particular user interface configuration, and communicating with an information processing apparatus, the communication apparatus comprising:
  a first sending unit configured to send user interface configuration information indicating a user interface configuration in use to the information processing apparatus;
  a reception unit configured to receive user information associated with the user interface configuration information in the information processing apparatus from the information processing apparatus; and
  a second sending unit configured to send a log of a performed operation while the user interface configuration in use is displayed, the log being sent in association with the user information received by the reception unit.

2. The communication apparatus according to claim 1, wherein the second sending unit sends the log to the information processing apparatus.

3. The communication apparatus according to claim 1, wherein the second sending unit sends the log to a second information processing apparatus different from the information processing apparatus.

4. The communication apparatus according to claim 1, wherein the user interface configuration information is used for the log in a case where the user information is unavailable for the log.

5. A method of controlling a communication apparatus capable of switching to a particular user interface configuration among a plurality of user interface configurations, displaying the particular user interface, and communicating with an information processing apparatus, the method comprising:
- sending user interface configuration information indicating a user interface configuration in use to the information processing apparatus;
- receiving user information associated with the user interface configuration information in the information processing apparatus from the information processing apparatus; and
- sending a log of a performed operation while the user interface configuration in use is displayed, the log being sent in association with the received user information.

6. An information processing system including:
- a communication apparatus capable of switching to a particular user interface configuration among a plurality of user interface configurations, and displaying the particular user interface configuration; and
- an information processing apparatus capable of communicating with the communication apparatus, wherein
the communication apparatus comprises:
- a first sending unit configured to send user interface configuration information indicating a user interface configuration in use to the information processing apparatus;
- a reception unit configured to receive user information associated with the user interface configuration information in the information processing apparatus from the information processing apparatus; and
- a second sending unit configured to send a log of a performed operation while the user interface configuration in use is displayed, the log being sent in association with the user information received by the reception unit, and the information processing apparatus comprises:
- a management unit configured to manage the user information in the communication apparatus and the user interface configuration information in the communication apparatus in association with each other;
- a second reception unit configured to receive the user interface configuration information from the communication apparatus, the user interface configuration information being sent by the first sending unit; and
- a third sending unit configured to send the user information to the communication apparatus based on receiving the user interface configuration information in the second reception unit, the user information being associated with the user interface configuration information received in the second reception unit, in the management unit.

7. The information processing system according to claim 6, wherein the second sending unit sends the log to the information processing apparatus.

8. The information processing system according to claim 6, wherein the second sending unit sends the log to a second information processing apparatus different from the information processing apparatus.

9. The information processing system according to claim 6, wherein the management unit receives the user information, identification information of the communication apparatus, the user interface configuration information indicating the user interface configuration in use, and correspondence information indicating correspondence between the user interface configuration information indicating the user interface configuration in use and the user information, from a third information processing apparatus different from the information processing apparatus.

10. The information processing system according to claim 6, wherein the communication apparatus uses the user interface configuration information for the log in a case where the user information is unavailable for the log in the communication apparatus.

* * * * *